Oct. 24, 1967  L. KATZ ETAL  3,348,490

COMBINED ELECTRIC MOTOR AND FLUID PUMP APPARATUS

Filed Sept. 7, 1965

INVENTORS
LEONHARD KATZ
JOHN H. SUNUNU

BY  Rines and Rines

ATTORNEYS

United States Patent Office 3,348,490
Patented Oct. 24, 1967

3,348,490
COMBINED ELECTRIC MOTOR AND FLUID PUMP APPARATUS
Leonhard Katz, Woburn, and John H. Sununu, Concord, Mass., assignors to Astro Dynamics, Inc., Burlington, Mass., a corporation of Massachusetts
Filed Sept. 7, 1965, Ser. No. 485,401
3 Claims. (Cl. 103—87)

ABSTRACT OF THE DISCLOSURE

The present invention involves a combined electric motor and fluid pump in which preferably axial and diverging fluid passages are formed in the motor rotor itself for impelling the fluid.

---

The present invention relates to combined motor and fluid pump apparatus, being more particularly, though not exclusively, directed to such apparatus employing, in summary, a common and unitary electric-motor rotor and fluid-pumping structure.

While numerous types of motor-driven pumping structures have been evolved and used through many decades, they have generally required separate or coupled fluid pump impellers and driving apparatus, such as that operated, for example, by separate electric motors and the like. In accordance with a discovery underlying the present invention, however, it has become possible to immerse the electric motor rotor structure in the liquid or related fluid medium-to-be-pumped and to adapt the very rotor structure itself, surprisingly without noticeably impairing its electrical operation, to serve inherently as the pump impeller, thereby greatly reducing the size of the combined motor and pump structure, increasing its efficiency, and obviating the necessity for separate coupled pump and motor-drive structures. Specifically, it has been found that if appropriately designed fluid passages are formed communicating from one end of the rotor to the other and through the magnetic material of the rotor itself, with the rotor mounted within and substantially filling the cross-section of a non-magnetic-fluid-containing housing in which the stator magnetic field permeates, that rotation of the rotor will cause fluid effectively to be pumped through the rotor passages and without any detectable influence upon the motor stator-rotor operating conditions.

An object of the invention, accordingly, is to provide a new and improved driving motor and fluid pump apparatus.

Still a further object is to provide unitary apparatus of this character in which the motor rotor serves also as the pump impeller.

An additional object is to provide a novel electric motor-pump apparatus.

Other and further objects wil be described hereinafter and will be more particularly pointed out in connection with the appended claims.

The invention will now be described with reference to the accompanying drawing, FIG. 1 of which is a longitudinal partly sectionalized view of an embodiment of the invention, illustrating the unitary rotor-pumping structure;

Figure 1:
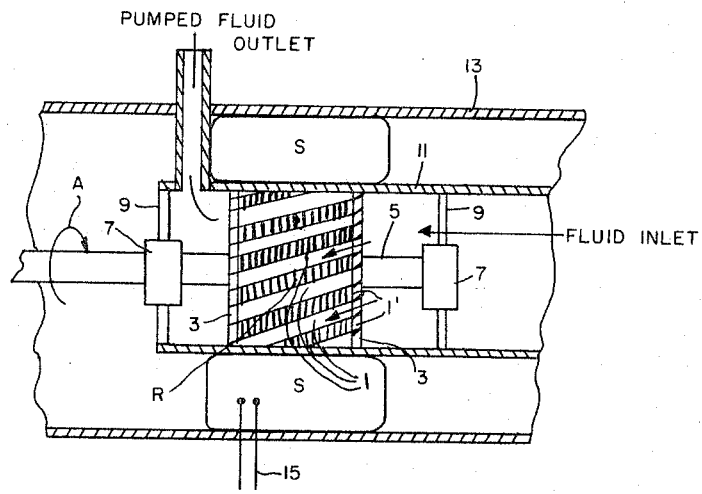

Referring to FIG. 1, a rotor R, illustrated as of the electrical type constructed in the form of stacked magnetic laminates held in cylindrical form by terminal copper rings or caps 3, is shown rotatably axially mounted by a shaft 5 within bearings 7, strut-supported at 9 within a tubular magnetic-field-permeable housing or chamber 11. External to the chamber 11 and in juxtaposition to the region occupied by the rotor R, the stator coils S of an electric motor are mounted within an outer casing 13. Excitation of the motor stator coils S by electric current applied at 15 produces a magnetic driving field at the housing walls and causes rotation of the rotor R about the shaft 5, as indicated by curved arrow A, provided the housing walls at 11 are non-magnetic and thus magnetic-field permeable.

As previously explained, it has been found that if appropriate passages are formed that communicate from the right-hand end of the rotor R to the left-hand end, as shown in the drawing, non-magnetic fluid applied from a source at the INLET can be caused to be effectively pumped by the rotor itself and forced through the OUTLET. In FIG. 1, these passages are in the form of a plurality of successive peripheral substantially parallel slots 1 cut through the magnetic laminate stack from one copper ring 3 to the other, extending at an acute angle to the direction of the axis of the rotor R or shaft 5. The rotor winding (not shown in the drawing in order to avoid complicating the same) will seat in the bottom of the slots, leaving substantial fluid passage volume in the slots thereabove. At the inlet side, the slots 1 are preferably skewed at a further angle, as at 1', to aid in scooping the fluid at the inlet into the impeller structure thus formed in the electrical rotor itself. By causing the maximum cross-dimension of the rotor R to correspond substantially to the inner diameter of the fluid housing 11 so as to be in close proximity to the inner walls thereof, extremely effective pumping action has been attained during the electrical excitation of the motor S–R, without any detectable change in the operating conditions of the motor. For example, with a rotor R approximately one inch in diameter and about three-quarters of an inch in length, seventeen slots 1 angularly inclined to the rotor axis at about 25°, with each slot about one-sixteenth of an inch deep, produced significant pumping action, reducing the speed of the rotor R by about one-half that attainable in the absence of the slots. With a stator S driven at 15 by a switching motor type circuit described, for example, in United States Letters Patent No. 3,098,958, issued July 23, 1963, to the applicant Leonhard Katz herein, the following measurements were attained:

| Stator Excitation Voltage (volts) | Rotor Speed With Slots 1 (r.p.m.) | Rotor Speed Without Slots 1 (r.p.m.) |
|---|---|---|
| 4 | 600 | 1,206 |
| 6 | 2,150 | 4,200 |
| 8 | 3,150 | 6,100 |

Figure 2:
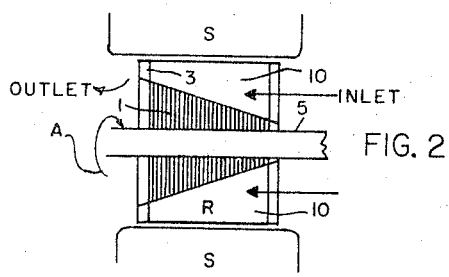
FIG. 2 is a longitudinal section of a modified rotor-impeller.
Figure 3:
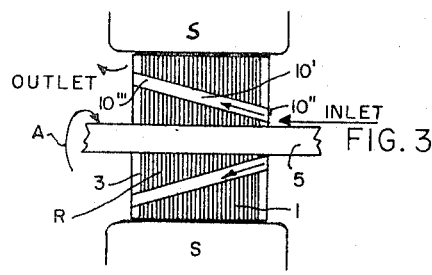
FIG. 3 is a view similar to FIG. 2 of a further modification.

It has further been found that the fluid resistance during pumping increased as the depth of the slots 1 was increased; and, perhaps more important, that if the depth of the angularly inclined slots in the rotor through the magnetic material thereof is caused to decrease from the inlet toward the outlet, as more particularly shown in the slots 10 of FIG. 2, that a most beneficial component of centrifugal action is introduced into the pumping. Centrifugal pumping action, moreover, was found to be increased by bringing the inlet end of the fluid-communicating passages through the rotor R closer to the center of the rotor and the outlet end thereof closer to the outer periphery of the rotor. Thus, in the embodiment of FIG. 3, diverging slots are formed as cylindrical intermediate holes 10' (preferably symmetrically disposed about the rotor, as in other embodiments herein) extending outward at an incline to the rotor axis through the magnetic material thereof from an inlet 10" near the shaft 5 to an outlet 10''' near the rotor periphery.

Figure 4:
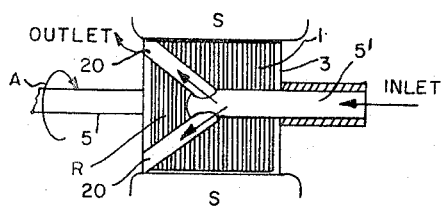
FIG. 4 is a sectional view like FIGS. 2 and 3 of a preferred embodiment.

Still a further highly efficient modification is illustrated in FIG. 4, taking such advantage of optimizing the use of centrifugal force in the combined electric-motor rotor rotation and fluid pumping, by introducing the fluid within a hollow axial aperture or passage 5' in the right-hand shaft section communicating with angularly diverging holes or passages 20 that terminate at or near the outer periphery of the rotor R. A somewhat similar construction is shown in FIG. 5 wherein the shaft is formed into an effective combined-shaft-and-bearing 5'', with the bearing-shaft 5'' contiguous with the rotor and within a closely positioned non-magnetic sleeve 21.

As a further example of the efficacy of the invention in actual practice, an approximately seven-eighths inch diameter, five-eighths inch long rotor R of the type shown in FIG. 4, with about a 45°-inclined pair of approximately three-sixteenths inch diameter and about one-half inch long passages 20, was successfully employed to pump 0.5 gallon of water per minute at approximately 5.5 pounds per square inch of pressure while the rotor R was rotated at 10,000 revolutions per minute by motor power applied to the stator S of only about 25 watts.

Figure 5:
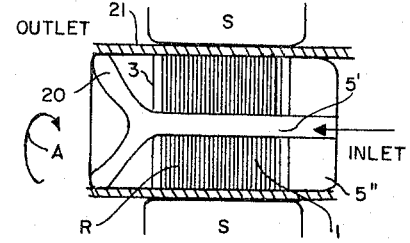
FIG. 5 is a longitudinal section of still another modified combined motor-pump structure using a rotor portion somewhat similar to that illustrated in FIG. 4.

The function of the non-magnetic or magnetic-field-permeable rotor chamber or housing 13 of FIG. 1 or 21 of FIG. 5 (as of plastic or other suitable material), may also be served by the stator coil S itself, by placing the coil windings in fluid-proof insulating coverings positioned close to the rotor R. The stator-coil covering then serves as a bounding chamber wall at which the magnetic field for driving the rotor is produced. The angle that the fluid-communicating passages makes with the axis of the rotor, either in a plane parallel to the axis, as in the peripheral cylindrical slot embodiment of FIG. 1, for example, or in a plane intersecting the axis, as in the embodiment of FIG. 4, for example, may be changed from passage to passage, if desired. Further, axially projecting scoops, such as rearward extensions of 1', may also be provided; and, in some embodiments, only a single passage or unsymmetrically disposed passages may be employed. Other and further modifications will also occur to those skilled in the art, including the use of any other desired type of motor or other drive for the rotor R, all herein generically termed "motor" drive, and all such as considered to fall within the spirit and scope of the invention as defined in the appended claims.

What is claimed is:
1. A combined fluid pump and electric motor having, in combination, a cylindrical motor rotor of magnetic material positioned coaxially within a cylindrical magnetic-field-permeable chamber in close proximity to the walls thereof, the chamber having a fluid inlet and a fluid outlet disposed at opposite inlet and outlet ends of the rotor, said rotor having shafts extending axially from said opposite ends thereof for mounting said rotor for rotation about its axis, the shaft at the inlet end of said rotor being hollow and providing a rotor inlet communicating with said chamber inlet, a source of non-magnetic fluid connected with the chamber inlet, means for generating a motor stator-coil field at the said walls surrounding the rotor, said rotor having a passage therethrough with a first section extending from said rotor inlet coaxially with the rotor to a second section diverging entirely to one side of the rotor axis and extending to a rotor outlet through the outlet end of the rotor adjacent to the periphery, the rotor pumping the fluid through said passage during its rotation in response to the said stator-coil field.

2. The combined pump and motor of claim 1, there being an additional passage section diverging from the junction of the first and second sections entirely to the opposite side of the rotor axis and extending to another such rotor outlet.

3. The combined pump and motor of claim 2, said rotor comprising a stack of magnetic lamination discs perpendicular to the rotor axis and through which said passage sections extend.

References Cited
UNITED STATES PATENTS

| | | | |
|---|---|---|---|
| 1,405,959 | 2/1922 | Woock et al. | 103—87 |
| 2,312,848 | 3/1943 | Pezzillo | 103—87 |
| 2,419,159 | 4/1947 | Pezzillo. | |
| 2,535,695 | 12/1950 | Pezzillo | 103—87 |
| 2,747,512 | 5/1956 | Fouche | 103—87 |
| 2,873,684 | 2/1959 | Kaeding | 103—87 |
| 2,976,808 | 3/1961 | Whitehurst | 103—87 |

FOREIGN PATENTS

| | | |
|---|---|---|
| 1,315,645 | 12/1962 | France. |
| 286,224 | 2/1953 | Switzerland. |

ROBERT M. WALKER, *Primary Examiner.*